United States Patent
Pandiri et al.

(10) Patent No.: US 10,302,509 B2
(45) Date of Patent: May 28, 2019

(54) TEMPERATURE SENSING FOR INTEGRATED CIRCUITS

(71) Applicant: Invecas, Inc., Santa Clara, CA (US)

(72) Inventors: Santosh Kumar Pandiri, Hyderabad (IN); Prasanth Kumar Krishna, Keralia (IN); Koushik De, Hyderabad (IN); Ankush Kumar Dubey, Katni (IN)

(73) Assignee: Invecas, Inc., Santa Clara, CA (US)

( * ) Notice: Subject to any disclaimer, the term of this patent is extended or adjusted under 35 U.S.C. 154(b) by 160 days.

(21) Appl. No.: 15/432,208

(22) Filed: Feb. 14, 2017

(65) Prior Publication Data

US 2018/0164163 A1     Jun. 14, 2018

Related U.S. Application Data

(60) Provisional application No. 62/432,819, filed on Dec. 12, 2016.

(51) Int. Cl.
*G01K 15/00* (2006.01)
*G01K 7/01* (2006.01)

(52) U.S. Cl.
CPC ............ *G01K 15/005* (2013.01); *G01K 7/01* (2013.01)

(58) Field of Classification Search
CPC ................. G01K 15/005; G01K 7/01
See application file for complete search history.

(56) References Cited

U.S. PATENT DOCUMENTS

| | | | | | |
|---|---|---|---|---|---|
| 5,336,943 | A | * | 8/1994 | Kelly | G01K 7/01 257/E29.259 |
| 5,873,053 | A | * | 2/1999 | Pricer | G01K 7/01 323/907 |
| 6,084,462 | A | * | 7/2000 | Barker | G01K 3/005 324/105 |
| 6,873,143 | B2 | * | 3/2005 | Moon | G05F 3/245 323/312 |
| 6,924,673 | B2 | * | 8/2005 | Tanishima | H03K 19/00315 327/108 |
| 6,940,318 | B1 | * | 9/2005 | Wong | H03K 5/08 327/77 |
| 6,957,910 | B1 | * | 10/2005 | Wan | G01K 7/01 327/512 |
| 7,078,954 | B2 | * | 7/2006 | Watanabe | G01K 7/21 323/315 |
| 7,098,720 | B1 | * | 8/2006 | Dow | G01K 7/425 323/315 |
| 9,203,350 | B2 | * | 12/2015 | Dempsey | H03F 1/223 |
| 2004/0245975 | A1 | * | 12/2004 | Tran | G05F 3/30 323/313 |
| 2004/0245977 | A1 | * | 12/2004 | Tran | G05F 3/30 323/315 |

(Continued)

*Primary Examiner* — Jonathan M Dunlap
*Assistant Examiner* — Philip L Cotey
(74) *Attorney, Agent, or Firm* — Venture Pacific Law, PC

(57) ABSTRACT

Temperature sensors for integrated circuits that use back-gate bias for low power operation. A temperature sensor can comprise a voltage-gate-source generator having sensing transistors; an Ibias generator; a back-gate bias generator; and a temperature read-out circuit. In a calibration mode, the temperature sensor determines a back-gate bias voltage and a resistor trimming code to be used during functional operation.

18 Claims, 13 Drawing Sheets

(56) References Cited

U.S. PATENT DOCUMENTS

| | | | | |
|---|---|---|---|---|
| 2005/0144576 A1* | 6/2005 | Furuta | ............... | G06F 17/5036 327/513 |
| 2006/0061406 A1* | 3/2006 | Takatori | ............... | G01K 1/14 327/350 |
| 2006/0197581 A1* | 9/2006 | Chun | ............... | G01K 7/01 327/512 |
| 2006/0226888 A1* | 10/2006 | Watanabe | ............... | G01K 7/21 327/512 |
| 2007/0030049 A1* | 2/2007 | Yoshikawa | ............... | G01K 7/01 327/512 |
| 2007/0047333 A1* | 3/2007 | Noh | ............... | G11C 5/147 365/189.09 |
| 2008/0175068 A1* | 7/2008 | Houston | ............... | G11C 5/143 365/185.27 |
| 2008/0252360 A1* | 10/2008 | Yoshikawa | ............... | G01K 7/01 327/512 |
| 2009/0085645 A1* | 4/2009 | Tanaka | ............... | H04B 1/0003 327/407 |
| 2011/0274140 A1* | 11/2011 | Takatori | ............... | G01K 1/14 374/178 |
| 2014/0266140 A1* | 9/2014 | Iriarte | ............... | G05F 3/242 323/313 |
| 2014/0340150 A1* | 11/2014 | Dempsey | ............... | H03F 1/223 330/260 |
| 2015/0063419 A1* | 3/2015 | Obayashi | ............... | G01K 7/01 374/163 |

\* cited by examiner

TEMPERATURE SENSING FOR INTEGRATED CIRCUITS

CROSS REFERENCE

This application claims priority from a provisional patent application entitled "Sub-1V Temperature Sensors Using FDSOI (22 nm) Adaptive Back-gate Biasing" filed on Dec. 12, 2016 and having application No. 62/432,819. Said application and any other referenced patents or patent applications herein are incorporated in its entirety by reference.

FIELD OF INVENTION

The disclosure relates to temperature sensors for integrated circuits, and, more particularly, to temperature sensors that use back-gate biasing.

BACKGROUND

Temperature sensors are an integral part to many integrated circuits ("ICs"). Such sensors have applications ranging from optimizing computation speed in microprocessors to compensating for temperature dependency in high precision complex circuits.

For high precision temperature sensors and reference generations, typically, bipolar junction transistor ("BJT") devices are used to implement such temperature sensors because of their superior characteristics over other types of transistors. However, BJT-based diodes have larger voltage-base-to-emitter ("VBE") requirements and need more supply voltage head room. Hence, BJT-based temperature sensors can't be operated directly at low power voltage supply levels (e.g., at around 1V or sub-1V). Furthermore, in deep-submicron process technologies, parasitic variations can be significant in BJT-based temperature sensors. BJT-based temperature sensors can also have large process spread and may need additional mask layers for better control.

Operationally for BJT-based temperature sensors, a substantially similar amount of current is pumped into two BJT devices of different sizes to develop voltage differences Vb1 and Vb2, respectively, across each of the BJT devices. As widely known, voltage drop across a BJT device for a given current can be proportional to temperature. The two voltage drops across the two different BJT devices can then be used to solve for an unknown temperature value.

For the foregoing reasons, there is a need for new methods and apparatuses for temperature sensors for ICs that can accurately sense a wide range of temperatures and can also be operated at low power.

SUMMARY

Briefly, the present disclosure is directed to temperature sensors for integrated circuits having back-gate bias control for low power operation. The present disclosure is further directed to temperature sensors that have a calibration mode for determining back-gate bias voltages and resistor trimming codes.

In some embodiments of the present disclosure directed to a temperature sensor, a temperature sensor for integrated circuits can comprise: a voltage-gate-source generator having sensing transistors with back-gate bias control; an Ibias generator, where the bias generator is coupled to the voltage-gate-source generator; a back-gate bias generator, where the back-gate bias generator is coupled to back gates of the sensing transistors of the voltage-gate-source generator; and a temperature read-out circuit, where the temperature read-out circuit is coupled to gates of the sensing transistors of the voltage-gate-source generator and where the temperature read-out circuit has at least one temperature output.

In further embodiments of the present disclosure, a method for calibrating a temperature sensor for integrated circuits can comprise the steps of: generating a resistor trim code; applying the resistor trim code to programmable resistors of the temperature sensor; generating a voltage trim code; and applying the voltage trim code to back gates of sensing transistors for the temperature sensor.

Other aspects, advantages, and salient features of the disclosure will become apparent to those skilled in the art from the following detailed description, which, taken in conjunction with the annexed drawings, discloses various embodiments of the present disclosure.

DESCRIPTION OF THE DRAWINGS

The foregoing and other aspects of the disclosure can be better understood from the following detailed description of the embodiments when taken in conjunction with the accompanying drawings.

DETAILED DESCRIPTION OF THE EMBODIMENTS

Figure 1:
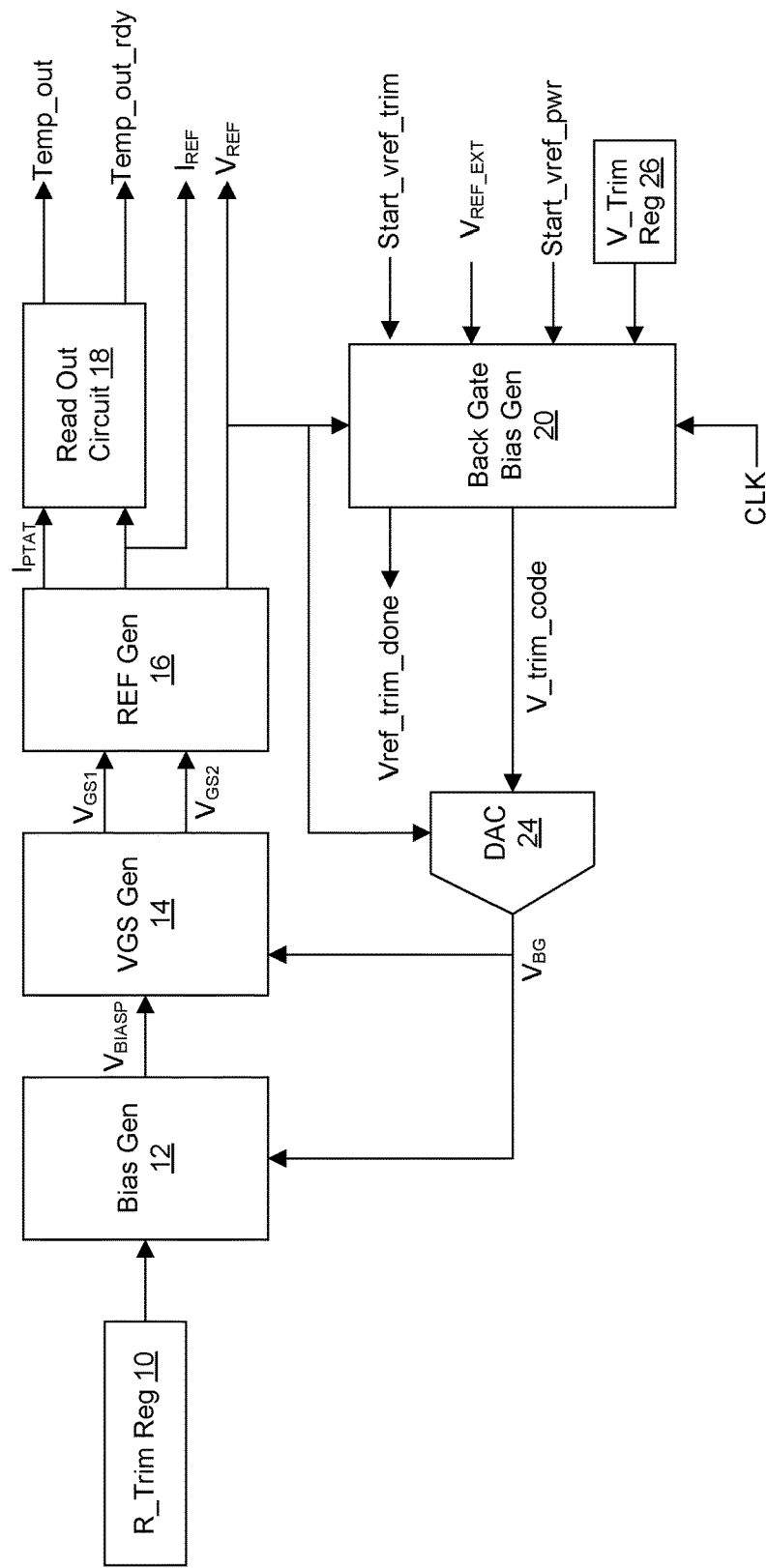
FIG. 1 is a block diagram for an embodiment of a temperature sensor of the present disclosure.

In the following detailed description of the embodiments directed to the subject matter of temperature sensors for integrated circuits, reference is made to the accompanying drawings, which form a part hereof, and in which is shown by way of illustration of specific embodiments in which the disclosure may be practiced. The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component" includes reference to one or more of such components or equivalent circuit/device(s) to the one or more components.

By the term "substantially", it is meant that the recited characteristic, parameter, or value need not be achieved exactly, but that deviations or variations, including for example, tolerances, measurement error, process error, measurement accuracy limitations and other factors known to those of skill in the art, may occur in amounts that do not preclude the effect the characteristic was intended to provide.

The term "have", "can have", "include", or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms, such as "include" or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A and/or B" may include A, may include B, or may include both A and B.

The expression "1", "2", "first", or "second" used in various embodiments of the present disclosure may modify various components of the various embodiments but does not limit the corresponding components in any manner, including to any particular order. For example, the above expressions do not limit the sequence and/or importance of the components. The expressions may be used for distinguishing one component from other components. For example, a first transistor device and a second transistor device may indicate different transistor devices although both of them are transistor devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

In some embodiments directed to a temperature sensor, the temperature sensor can be implemented, in part, by complementary-metal-oxide-semiconductor ("CMOS") devices having back-gate bias control, e.g., as offered in fully-depleted-silicon-on-insulator ("FD SOT") technologies. The use of CMOS devices having back-gate bias control can be used to correct for offset and significant slope variations in $V_{GS}$ temperature characteristics across process skew. Thus, adaptive back-gate bias can be used to reduce offset in temperature characteristics. Also, resistor trimming in a bias generator can be used to contain current $I_{BIAS}$ variation across process, which could otherwise induce slope error in temperature characteristics.

FIG. 1 is a block diagram for an embodiment of a temperature sensor of the present disclosure. In some embodiments directed to a temperature sensor, a temperature sensor includes a resistor trim register 10, a bias ("Ibias") generator 12, a voltage-gate-source ("$V_{GS}$") generator 14, a reference generator 16, a read-out circuit 18, a back-gate bias generator 20 having a calibration mode and a functional mode, a digital-to-analog converter 24, and a voltage trim register 26. The resistor trim register 10 stores a resistor trim code obtained during calibration to input to the bias generator 12. The resistor trim code adjusts the resistance of programmable resistors of the bias generator 12. The bias generator 12 can generate bias voltage $V_{BIASP}$ to input to the $V_{GS}$ generator 14. The back gates of certain transistors of the bias generator 12 and the $V_{GS}$ generator 14 are biased by an applied back-gate voltage $V_{BG}$.

The $V_{GS}$ generator 14 outputs gate-source voltages $V_{GS1}$ and $V_{GS2}$ to the reference generator 16. The gate-source voltages $V_{GS1}$ and $V_{GS2}$ are generated by driving current through back-gate-biased transistors of different sizes in the $V_{GS}$ generator 14. The gate-source voltages $V_{GS1}$ and $V_{GS2}$ are then inputted to the reference generator 16 to determine a reference voltage $V_{REF}$ (which can also be referred in some embodiments as $V_{REF\_INT}$) and currents $I_{PTAT}$ and $I_{REF}$, which can be indicative of a sensed temperature value. The reference generator 16 can comprise a current $I_{CTAT}$ generator, a current $I_{PTAT}$ generator, and an internal reference voltage $V_{REF\_INT}$ generator (not shown here, but elaborated further in the following disclosure). The currents $I_{PTAT}$ and $I_{REF}$ are inputted to the read-out circuit 18 to generate a temperature value, Temp_out, and an indication of whether the temperature value is ready to be read, Temp_out_rdy.

The reference voltage $V_{REF}$ is inputted to the back-gate bias generator 20 and the DAC 24. The back-gate bias generator 20 can have a calibration mode for initially calibrating the temperature sensor and a functional mode to set the back-gate voltage during power up of the temperature sensor for operation.

During calibration, an initial voltage trim signal Start_vref_trim and an external reference voltage $V_{REF\_EXT}$ are inputted to the back-gate bias generator 20. The back-gate bias generator 20 generates a digital voltage trim code, V_trim_code. The DAC 24 converts that digital code to an analog signal, referred to as a back-gate voltage $V_{BG}$. The back-gate voltage $V_{BG}$ is applied to back gates of the certain transistors of the bias generator 12 and the voltage generator 14. An internal reference voltage $V_{REF}$ is generated by the reference generator 16.

The internal reference voltage $V_{REF}$ can then be compared to the external reference voltage $V_{REF\_EXT}$. If the internal reference voltage $V_{REF}$ is not within a predefined threshold from the external reference voltage $V_{REF\_EXT}$, the voltage trim code V_trim_code is adjusted accordingly, causing a change in the internal reference voltage, to perform a feedback loop to get the internal reference voltage $V_{REF}$ closer to the external reference voltage $V_{REF\_EXT}$. Once the internal reference voltage $V_{REF}$ and the external reference voltage $V_{REF\_EXT}$ are within the predefined threshold value, the voltage trim code V_trim_code last used in generating the internal reference voltage is stored in the voltage trim register 26 for use during the functional mode. A Vref_trim_done signal can be used to indicate that voltage trimming is finished and the calibration can exit from the feedback loop.

When the temperature sensor is powered up, the temperature sensor can be placed in a functional mode. A startup phase can initiate, in which the stored voltage trim code is used to recalibrate the back-gate voltage. Since the external reference voltage $V_{REF\_EXT}$ is not applied (and/or not present) during the functional mode, the back-gate voltage can be ramped up in voltage step intervals and the reference voltage generated for each increase until the applied back-gate voltage reaches the stored voltage trim code. For instance, the back-gate voltage can start at a voltage that is half the value of the stored voltage trim code, and is increased after every iteration by a step voltage value until back-gate voltage reaches the stored voltage trim code. Once the stored voltage trim code is reached, a Vref_trim_done signal can be generated to indicate voltage trimming for the calibration mode or for the functional mode is completed. A clock signal CLK can be used to clock the back-gate bias generator 20 and other components of the temperature sensor.

It is understood by a person having ordinary skill in the art that additional components of a temperature sensor can be included within the scope of the present disclosure. Furthermore, a subset of such components can also be used within the scope and spirit of the present disclosure directed to a temperature sensor. In some embodiments of the present disclosure directed to a temperature sensor, a temperature sensor can include: a voltage-gate-source generator having sensing transistors; a bias generator, where the bias generator is coupled to the voltage-gate-source generator; a back-gate bias generator, where the back-gate bias generator is coupled to back gates of the sensing transistors of the voltage-gate-source generator; and a temperature read-out circuit, where the temperature read-out circuit is coupled to gates of the sensing transistors of the voltage-gate-source generator and where the temperature read-out circuit has at least one temperature output. Furthermore, the temperature sensor can further comprise a reference generator, where the temperature read-out circuit and the voltage-gate-source generator are coupled via the reference generator. Additionally, the bias generator can include programmable resistors, where the programmable resistors have inputs for a resistor trimming code. Also, the temperature sensor can comprise a resistor trimmer, wherein the resistor trimmer has an output for the resistor trimming code.

Figure 2:
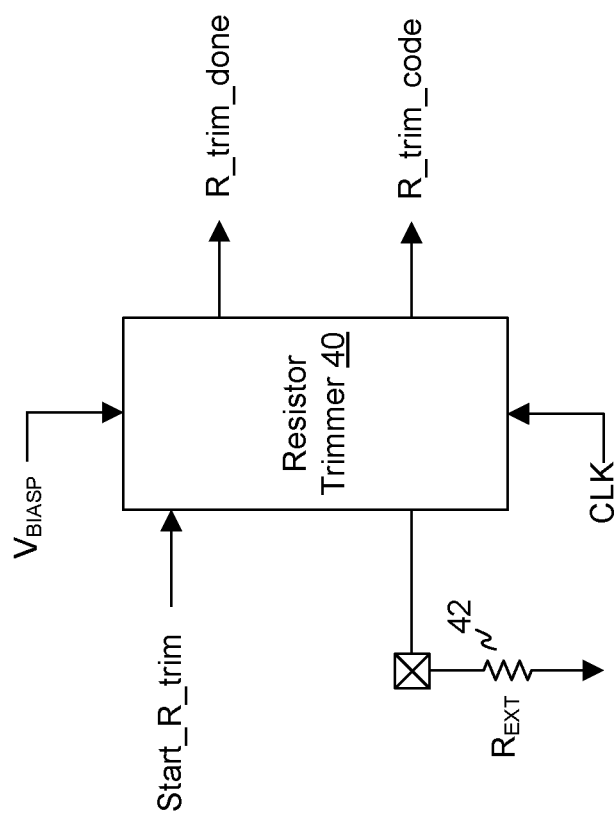
FIG. 2 is a block diagram for a resistor trimmer of some embodiments directed to a temperature sensor.

FIG. 2 is a block diagram for a resistor trimmer for resistor calibration of some embodiments directed to a temperature sensor. In such embodiments, a resistor trimmer 40 can be used for generating a resistor trim code R_trim_code to adjust the internal resistors of the temperature sensor to substantially match ideal, external resistances, e.g., of an external resistor 42 of a resistance $R_{EXT}$. An initiate signal Start_R_trim can initiate the resistor trimming and an end signal R_trim_done can end the resistor trimming. The bias voltage $V_{BIASP}$ can drive current through a programmable, internal resistor of the resistor trimmer 40 and the external resistor 42 to compare the voltage drops across both resistors to determine the difference between the two. Based on this information, the programmable internal resistor can be adjusted using the resistor trim code to attempt to match the external resistor 42 if the two are not within a predefined threshold. A clock signal CLK can be used to drive the resistor trimmer 40.

Figure 3:
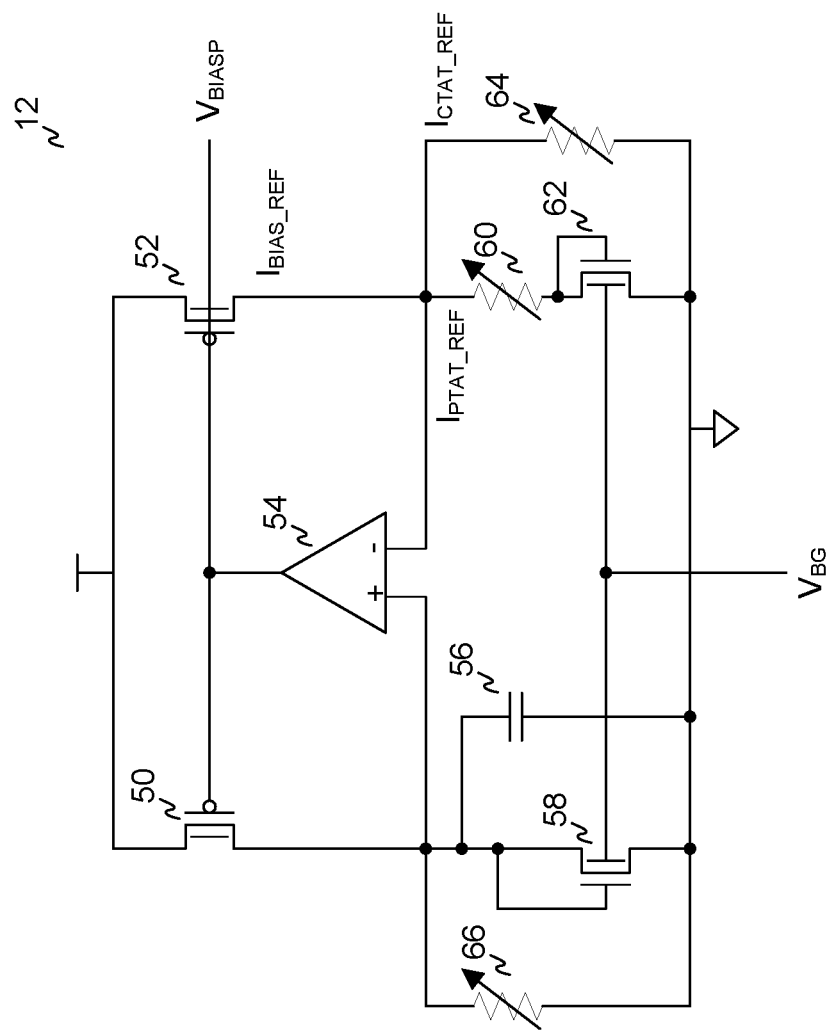
FIG. 3 is a circuit diagram for a bias generator of some embodiments directed to a temperature sensor.

FIG. 3 is a circuit diagram for a bias generator of some embodiments directed to a temperature sensor of the present disclosure. In such embodiments, the bias generator 12 can include PMOS transistors 50 and 52, NMOS transistors with back-gate bias control 58 and 62, an operational amplifier ("opamp") 54, a capacitor 56, and programmable resistors 66, 60, and 64. The programmable resistors 66, 60, and 64 can be set to different resistances. However, the resistor trim code can be used to control the proportion of change in resistances for the programmable resistors 66, 60, and 64 even though the resistances may be of different values. The resistor 66, transistor 58, and the capacitor 56 are connected in parallel across a first input (a positive input) of the opamp 54 and ground potential. The capacitor imbalance caused by having the capacitor 56 across the connected transistor 58 can ensure a negative feedback loop in the bias generator even during the startup phase, where fast transients may occur. The gate of the transistor 58 is connected to the first input of the opamp 54. The back-gate voltage $V_{BG}$ is applied to back gates of the transistors 58 and 62. The resistor 60 and the transistor 62 are serially connected with the gate of the transistor 62 connected to an end of the resistor 60. The serially-connected resistor 60 and transistor 62 branch is connected in parallel with the resistor 64 across a second input (a negative input) of the opamp 54 and the ground potential.

The output of the opamp 54 generates the $V_{BIASP}$ signal, which is applied to the gates of the transistors 50 and 52. The transistor 50 is connected across a high voltage rail and the first input of the opamp 54 and the transistor 52 is connected across the high voltage rail and the second input of the opamp 54. A current through the transistor 52 can be referred to as $I_{BIAS\_REF}$; a current through the serially-connected resistor 60 and transistor 62 branch can be referred to as $I_{PTAT\_REF}$; and a current through the resistor 64 can be referred to as $I_{CTAT\_REF}$.

It is appreciated that other implementations for a bias generator are envisioned within the scope of the present disclosure. In order to aid in the understand of the present disclosure, an example implementation is provided, but is not meant to limit the scope of the present disclosure in any way and is merely one example.

Figure 4:
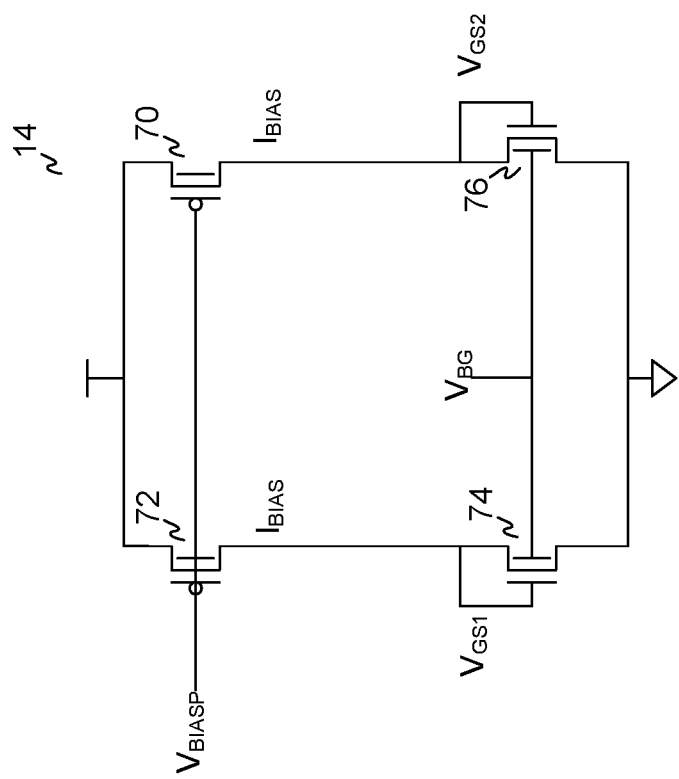
FIG. 4 is a circuit diagram for a $V_{GS}$ generator of some embodiments directed to a temperature sensor.

FIG. 4 is a circuit diagram for a $V_{GS}$ generator of some embodiments directed to a temperature sensor. In such embodiments, the $V_{GS}$ generator 14 can comprise PMOS transistors 70 and 72 and NMOS transistors of different sizes with back-gate bias control 74 and 76. The transistors 74 and 76 are gate-source connected. The serially-connected transistors 72 and 74 are connected in parallel with the serially-connected transistors 70 and 76 across a high rail voltage and a ground potential. The current through the transistor 72 can be referred to as $I_{BIAS}$. The current through the transistor 70 should be substantially similar to the current through the transistor 70 since those transistors 72 and 70 are of substantially similar size. Thus, current through the transistor 70 can be referred to as the $I_{BIAS}$ current as well. The transistors 74 and 76 are different sizes, providing for different gate-source voltages $V_{GS1}$ and $V_{GS2}$. The gate-source voltages $V_{GS1}$ and $V_{GS2}$ can be used to determine a sensed temperature. Thus, the transistors 74 and 76 and other equivalents that have a similar function can be referred to as "sensing transistors". The back-gate voltage $V_{BG}$ is applied to back gates of the transistors 74 and 76.

It is appreciated that other implementations for a $V_{GS}$ generator are envisioned within the scope of the present disclosure. In order to aid in the understand of the present disclosure, an example implementation is provided, but is not meant to limit the scope of the present disclosure in any way and is merely one example.

Figure 5:
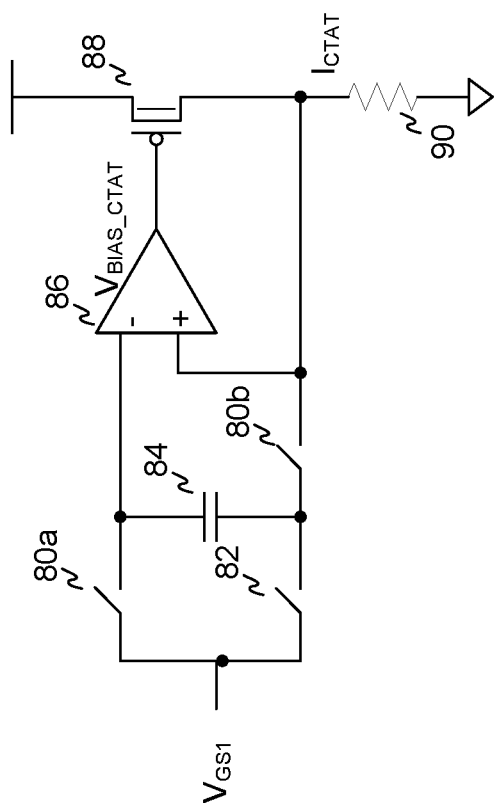
FIG. 5 is a circuit diagram for a $I_{CTAT}$ current generator of some embodiments directed to a temperature sensor.

FIG. 5 is a circuit diagram for a $I_{CTAT}$ current generator of some embodiments directed to a temperature sensor of the present disclosure. In such embodiments, the current $I_{CTAT}$ generator comprises switches 80a, 80b, and 82, a capacitor 84, an opamp 86, a PMOS transistor 88, and a resistor 90. The switches 80a and 80b are on when the switch 82 is off, and vice versa. The $V_{GS1}$ voltage is applied to first ends of switches 80a and 82. A second end of the switch 80a is connected to a first input (a negative input) of the opamp 86 and a first end of the capacitor 84. A second end of the switch 82 is connected to a second end of the capacitor 84 and a first end of the switch 80b. The second end of the switch 80b is connected to a second input (a positive input) of the opamp 86 and a node connecting the transistor 88 and the resistor 90. The opamp 86's output $V_{BIAS\_CTAT}$ is connected to the gate of the transistor 88. The transistor 88 and resistor 90 are serially connected across a high voltage rail and a ground potential. The current through the resistor 90 can be referred to as the current $I_{CTAT}$. The current $I_{CTAT}$ can be equal to $V_{GS1}/R$, where R is a resistance for the resistor 90.

It is appreciated that other implementations for the current $I_{CTAT}$ generator are envisioned within the scope of the present disclosure. In order to aid in the understand of the present disclosure, an example implementation is provided, but is not meant to limit the scope of the present disclosure in any way and is merely one example.

Figure 6:
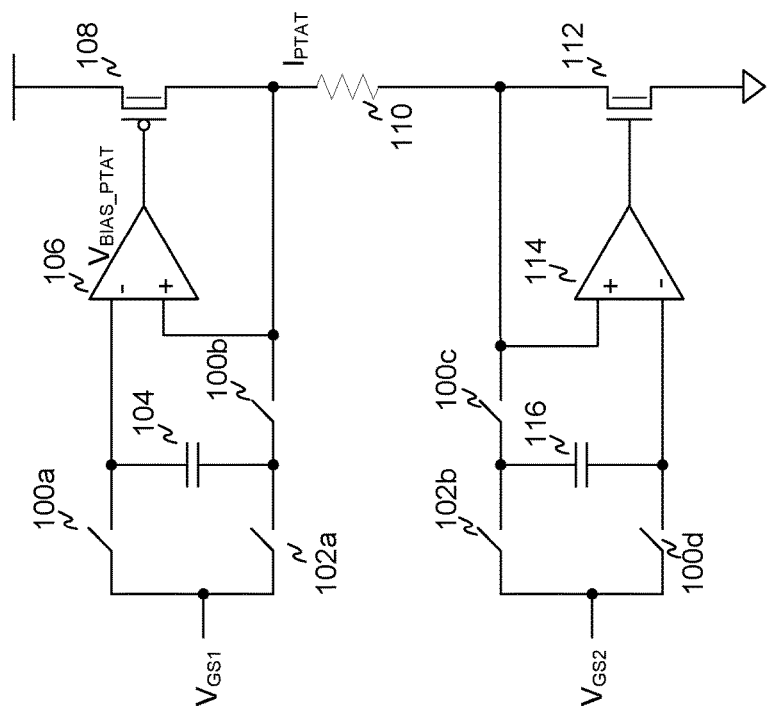
FIG. 6 is a circuit diagram for a $I_{PTAT}$ current generator of some embodiments directed to a temperature sensor.

FIG. 6 is a circuit diagram for a current generator of some embodiments directed to a temperature sensor of the present disclosure. In such embodiments directed to a current $I_{PTAT}$ generator for the reference generator 16, the current $I_{PTAT}$ generator comprises switches 100a-100d and 102a-102b, capacitors 104 and 116, opamps 106 and 114, a PMOS transistor 108, a resistor 110, and an NMOS transistor 112.

The $V_{GS1}$ voltage is applied to first ends of switches 100a and 102a. A second end of the switch 100a is connected to a first input (a negative input) of the opamp 106 and a first end of the capacitor 104. A second end of the switch 102a is connected to a second end of the capacitor 104 and a first end of the switch 100b. A second end of the switch 100b is connected to a second input (a positive input) of the opamp 106 and a connection between the transistor 108 and the resistor 110. The opamp 106's output $V_{BIAS\_PTAT}$ is coupled to the gate of the transistor 108. The PMOS transistor 108, the resistor 110, and the NMOS transistor 112 are serially connected across a high voltage rail and a ground potential. The current through the resistor 110 can be referred to as the current $I_{PTAT}$. The current $I_{PTAT}$ can be equal to ($V_{GS1}-V_{GS2}$)/R1, where R1 is a resistance for the resistor 110.

The $V_{GS2}$ voltage is applied to first ends of switches 100d and 102b. A second end of the switch 100d is connected to a first input (a negative input) of the opamp 114 and a first end of the capacitor 116. A second end of the switch 102b is connected to a second end of the capacitor 116 and a first end of the switch 100c. A second end of the switch 100c is connected to a second input (a positive input) of the opamp 114 and a connection between the resistor 110 and the NMOS transistor 112. The opamp 114's output is coupled to the gate of the NMOS transistor 112. The switches 100a-100d are controlled by a first control signal and the switches 102a-102b are controlled by a second control signal. When the switches 100a-100d are on, the switches 102a-102b are off, and vice versa.

It is appreciated that other implementations for the current $I_{PTAT}$ generator are envisioned within the scope of the present disclosure. In order to aid in the understand of the present disclosure, an exemplary implementation is provided, but is not meant to limit the scope of the present disclosure in any way and is merely one example.

Figure 7:
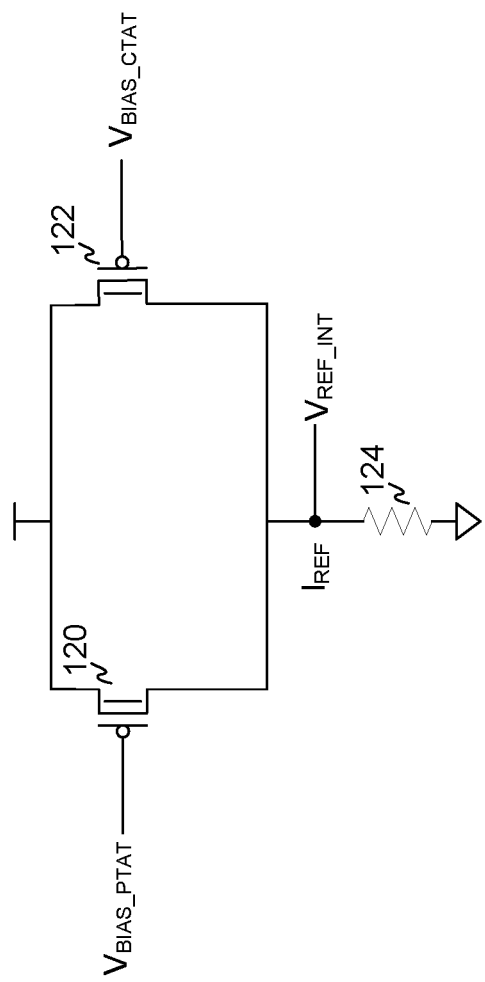
FIG. 7 is a circuit diagram for a reference voltage generator of some embodiments directed to a temperature sensor.

FIG. 7 is a circuit diagram for an internal reference voltage generator of some embodiments directed to a temperature sensor of the present disclosure. In such embodiments, the $V_{REF\_INT}$ generator comprises PMOS transistors 120 and 122 and a resistor 124. The PMOS transistors 120 and 122 are connected in parallel across a high rail voltage and a first end of the resistor 124, where this connection provides the internal reference voltage $V_{REF\_INT}$. A current through the resistor 124 can be referred to as the $I_{REF}$ current. $I_{REF}$ can be relatively independent of temperature and can be obtained by copying $I_{PTAT}$ and $I_{CTAT}$ in appropriate proportions. The $V_{BIAS\_PTAT}$ voltage, shown in FIG. 6, is applied to a gate of the PMOS transistor 120 and the $V_{BIAS\_CTAT}$ voltage, shown in FIG. 5, is applied to a gate of the PMOS transistor 122.

It is appreciated that other implementations for the $V_{REF\_INT}$ generator are envisioned within the scope of the present disclosure. In order to aid in the understand of the present disclosure, an example implementation is provided, but is not meant to limit the scope of the present disclosure in any way and is merely one example.

As previously mentioned, in some embodiments, the reference generator 16 includes the $I_{CTAT}$ current generator (illustrated in FIG. 5), the $I_{PTAT}$ current generator (illustrated in FIG. 6), and the $V_{REF\_INT}$ generator (illustrated in FIG. 7). The reference generator 16 can cancel process-dependent, op-amp offset error at the input stage using auto zeroing techniques. Currents thus generated have better temperature characteristics compared to $I_{PTAT\_BIAS}$ and $I_{CTAT}$ BIAS in the bias generator because the voltages $V_{GS1}$ and $V_{GS2}$ here are generated by relatively temperature independent bias currents. The currents $I_{PTAT}$ and $I_{CTAT}$ can then be mixed such that the reference current $I_{REF}$ can be derived. This current can then be pumped into one or more resistors to generate the internal reference voltage $V_{REF\_INT}$. This internal reference voltage can be used as a reference voltage for the DAC 24 for back-gate bias generation. Thus, an interdependency exists between the back-gate voltage $V_{BG}$ and the internal reference voltage $V_{REF\_INT}$.

Figure 8:
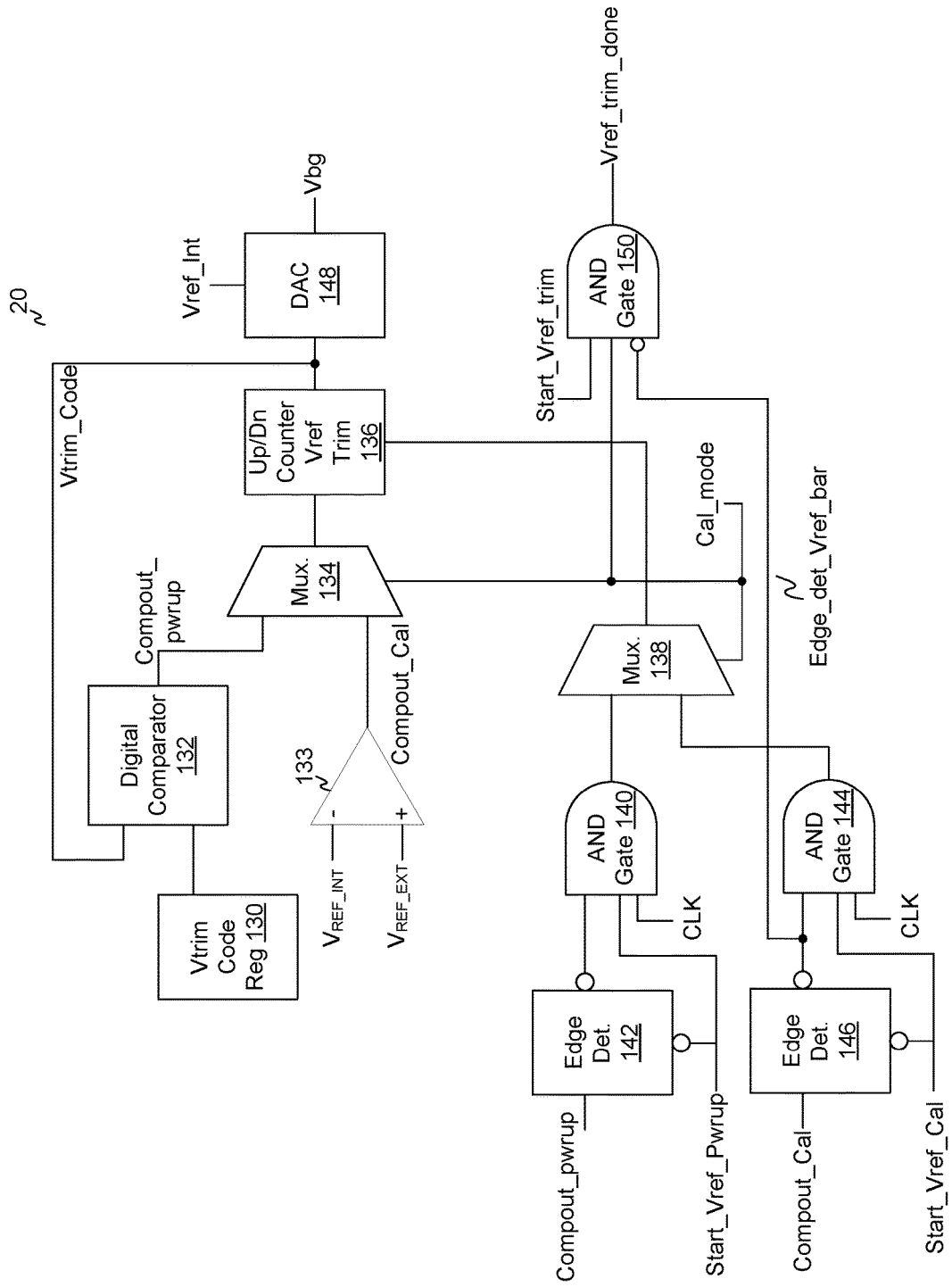
FIG. 8 is a circuit diagram for a back-gate bias generator of some embodiments directed to a temperature sensor.

FIG. 8 is a circuit diagram for a back-gate bias generator of some embodiments directed to a temperature sensor of the present disclosure. In such embodiments, the back-gate bias generator 20 includes: a V_trim_code register 130, a digital comparator 132, an analog comparator 133, multiplexers 134 and 138, a counter 136, and a digital-to-analog converter ("DAC") 148, AND gates 140, 144, and 150, and edge detectors 142 and 146. An output of the comparator 132 is connected to a first input of the multiplexer 134. An output of the comparator 133 is connected to a second input of the multiplexer 134. An output of the multiplexer 134 is connected to an input of the counter 136. An output of the counter 136 is connected to an input of the DAC 148 and a first input of the comparator 132. The register 130 for storing the voltage trim code is coupled to a second input of the comparator 132. The internal reference voltage $V_{REF\_INT}$ is applied to a first input of the comparator 133 and the DAC 148. The external reference voltage $V_{REF\_EXT}$ is applied to a second input of the comparator 133. A calibration mode signal Cal_mode is applied to a control input of the multiplexer 134 and a control input of the multiplexer 138.

An input of the edge detector 142 is coupled to the output of the comparator 132. A negated output of the edge detector 142, a power startup signal Start_Vref_Pwrup, and a clock signal CLK are coupled to inputs of the AND gate 140. The edge detector 142 is clocked by a negated power startup signal. An output of the AND gate 140 is connected to a first input of the multiplexer 138. An input of the edge detector 146 is coupled to the output of the comparator 133. A negated output of the edge detector 146, a calibration startup signal Start_Vref_Cal, and the clock signal CLK are coupled to inputs of the AND gate 144. The edge detector 146 is clocked by the negated calibration startup signal Start_Vref_Cal. An output of the AND gate 144 is connected to a second input of the multiplexer 138. An output of the multiplexer 138 is inputted to the counter 136.

The AND gate 150 can be used to indicate when the voltage trimming is completed. The AND gate 150 receives the Edge_det_Vref_bar signal from the edge detector 146, the start voltage trimming signal Start_Vref_trim, and the calibration mode signal Cal_mode as inputs, and outputs the Vref_trim_done signal to indicate when the voltage trimming has finished.

Operationally, the internal reference voltage $V_{REF\_INT}$ can be used to sense process skew and offset variations, and then correct them through a feedback loop during calibration phase. In the feedback loop, the voltages $V_{REF\_INT}$ and $V_{REF\_EXT}$ are compared to each other, resulting in either incrementing or decrementing the $V_{REF}$ trim counter. The reference voltage trim counter can be connected to the DAC to generate the back-gate bias voltage. This in turn adjusts the gate-source voltages $V_{GS1}$ and $V_{GS2}$. The voltage $V_{REF\_INT}$ can be adjusted further, until the voltage $V_{REF\_INT}$ converges substantially close to the voltage $V_{REF\_EXT}$. When the voltage $V_{REF\_INT}$ reaches such conversion, the output of voltage trim counter 136 can be stored as the final V_trim_code. This voltage trim code can be used to compensate for offset variations in the functional mode by bringing the $V_{REF\_INT}$ close to an expected voltage level.

Typically, $V_{REF\_EXT}$ may not be used during the functional mode operation of the temperature sensor. It can be observed that $V_{REF\_INT}$ can be used as a reference voltage for the DAC to generate $V_{BG}$. Hence, inter-dependence can exist between $V_{BG}$ and $V_{REF\_INT}$. During the functional mode, applying the voltage trim code directly does not necessarily bring the $V_{REF\_INT}$ voltage level close to the expected voltage value because of this interdependence. The error in this case can be process dependent. Such static error can be resolved by replicating the correction process in the functional mode as it happened during calibration mode. This replication can be achieved by initiating the voltage trim counter from a middle value of the voltage trim code in both phases. For instance in functional mode, the counter would stop incrementing or decrementing by one every clock signal of the CLK signal once it reaches the V_trim_code obtained during the calibration mode. Thus, self-correction of $V_{REF\_INT}$ can be achieved.

Figure 9:
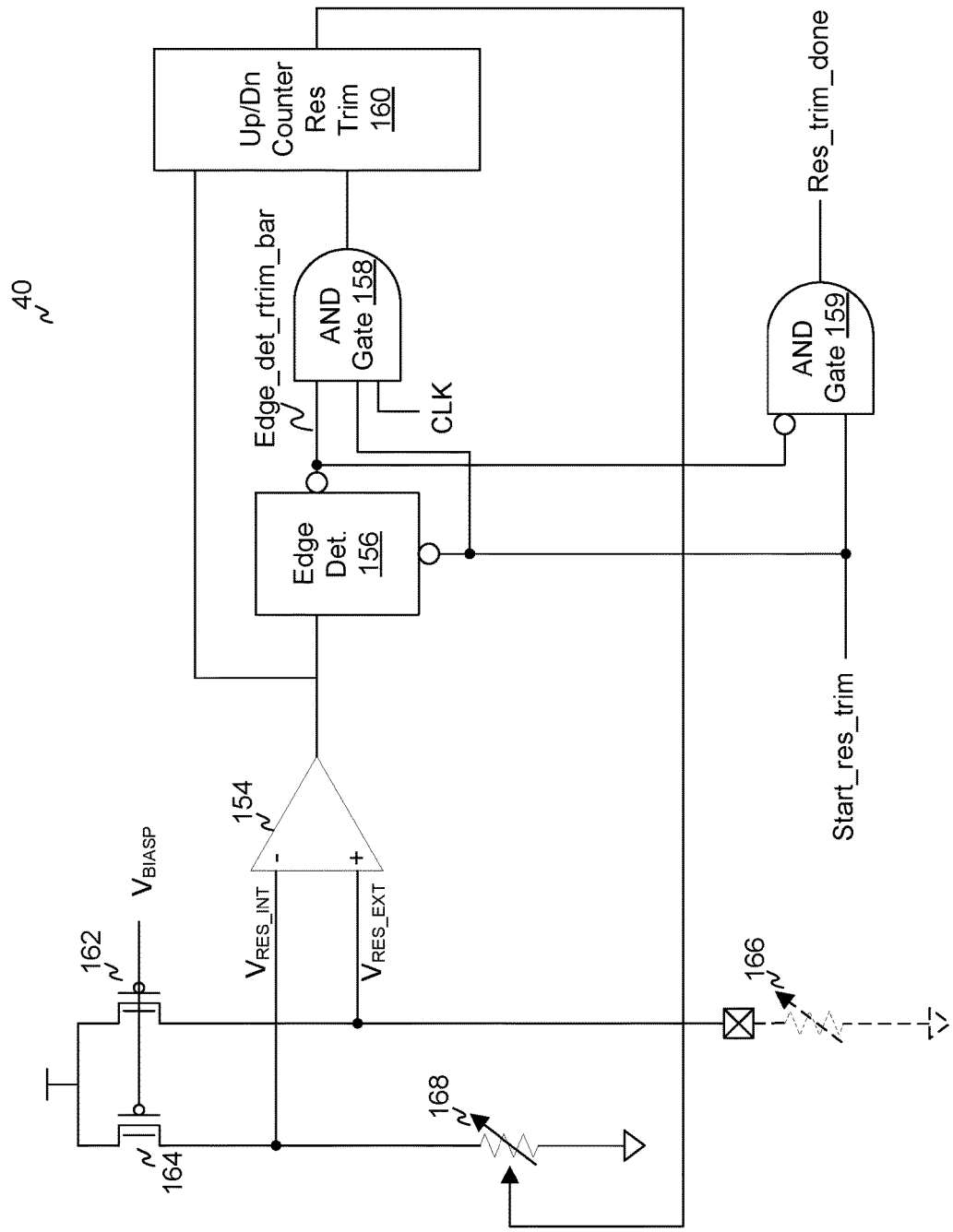
FIG. 9 is a circuit implementation for some embodiments directed to a resistor trimmer.

FIG. 9 is a circuit implementation for some embodiments of a resistor trimmer. In such embodiments, a resistor trimmer of the temperature sensor includes: a comparator 154; an internal programmable resistor 168; an edge detector 156; AND gates 158 and 159; an up/down counter 160; PMOS transistors 162 and 164. The PMOS transistors 162 and 164 are connected to the internal programmable resistor 168 and an external resistor 166 via a pad to generate a substantially similar current through each resistor component.

Inputs of the comparator 154 are connected to the internal programmable resistor 168 and to the pad connected to the external resistor 166 to compare an internal resistor voltage Vres_int at the internal programmable resistor 168 and an external resistor voltage Vres_ext at the external programmable resistor 166. An output of the comparator 154 is coupled to an input of the edge detector 156 and the counter 160. An output of the edge detector 156 is negated, and then connected to an input of the AND gate 158 and a negated-input of the AND gate 159. The AND gate 158 has additional inputs for a start resistor trimming signal Start_res_trim signal and a clock signal CLK.

The edge detector 156 can be reset by a negated, Start_res_trim signal. The edge detector 156 can be initially set to a logic 0. The Start_res_trim is also connected to an input of the AND gate 159. The output of the AND gate 159 is a resistor trim done signal Res_trim_done, indicating that the resistor trimming is finished. The output of the AND gate 158 is connected to an input of the counter 160. The output of the comparator 154 is connected to another input of the counter 160 to indicate to the counter to add or subtract from the counted value. The counter value is used to adjust the resistance of the internal programmable resistor. For instance, the counter value can be referred to as the resistor trim code. When the resistor trim code is increased, then the resistance of the programmable resistor 168 can be increased by a predefined step size that is correlated with the increase in the resistor trim code. Alternatively, if the resistor trim code is decreased, then the resistance of the programmable resistor 168 can be decreased by the predefined step size that is correlated with the decrease in the resistor trim code. It is apparent to a person having ordinary skill in the art that other ways to operate the programmable resistor can be used in conjunction with the present disclosure.

In particular, if the Vres_int voltage is less than the Vres_ext voltage, the comparator 154 can output such determination to the counter 160. The counter 160 would then adjust the counter value and output that value to the internal programmable resistor 168 to increase its resistance. If the Vres_int voltage is greater than the Vres_ext voltage, the comparator 154 will also output such determination to the counter 160. The counter 160 would then adjust the counter value and output that value to the internal programmable resistor 168 to reduce its resistance.

In some embodiments, 8-bit binary weighted trimmable resistors can be used. Furthermore, a mirror current can be pumped into the external resistor 166 and internal resistor 168. Voltage developed across the resistors are compared and an 8-bit counter is incremented/decremented until Vres_int and Vres_ext are substantially close in value. The resistor trim code that is settled on, which is outputted by the counter, can be referred to as the R_trim_code and can be used for the functional mode of the respective temperature sensor.

Figure 10:
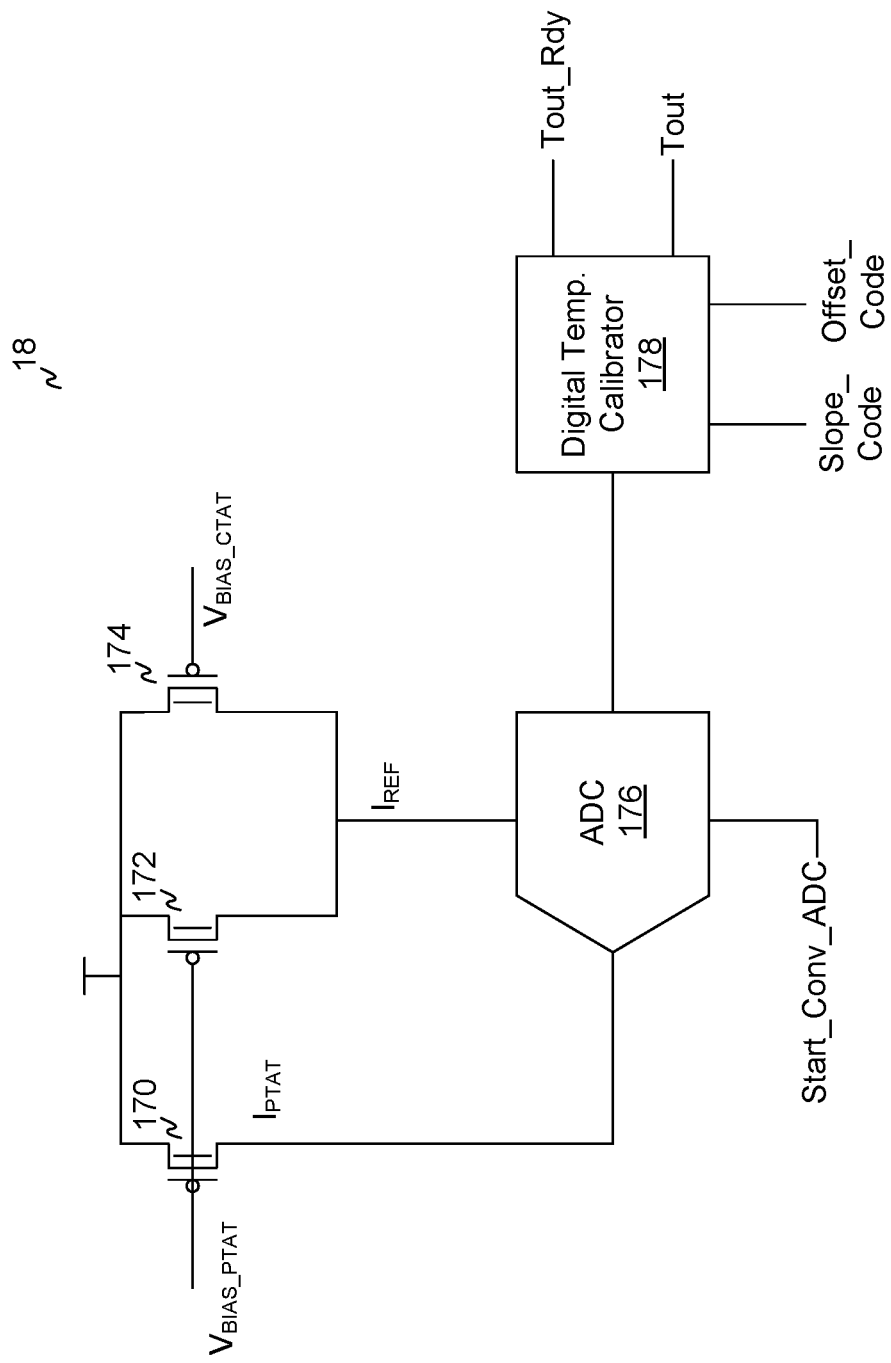
FIG. 10 is circuit diagram for some embodiments directed to a read-out circuit.

FIG. 10 is circuit diagram for some embodiments of a read-out circuit. In such embodiments, a read-out circuit 18 of the temperature sensor includes PMOS transistors 170, 172, and 174, an analog-to-digital converter ("ADC") 176, and a digital temperature calibrator 178. The PMOS transistor 170 is connected across a high rail voltage and an input of the ADC 176, where the current from the PMOS transistor 170 can be referred as a current $I_{PTAT}$. The PMOS transistors 172 and 174 are connected in parallel across the high rail voltage and another input of the ADC 176, providing a current $I_{REF}$ to the ADC 176.

The $V_{BIAS\_PTAT}$ voltage is applied to gates of the PMOS transistors 170 and 172, and the $V_{BIAS\_CTAT}$ voltage is applied to the gate of the PMOS transistor 174. The Start_Conv_ADC signal can be used to initiate the conversion of the analog signal to digital signals by the ADC 176. The digital output of the ADC 176 is inputted to the digital temperature calibrator 178. The digital temperature calibrator 178 outputs a temperature out signal, Tout, to indicate a sensed temperature value and a Tout_rdy signal to indicate when the Tout signal is ready to be read. A slope_code and an offset_code can be inputted to the calibration unit to provide a reference for converting the digital code to a temperature reading.

It is appreciated that other implementations for the read-out circuit are envisioned within the scope of the present disclosure. In order to aid in the understand of the present disclosure, an example implementation is provided, but is not meant to limit the scope of the present disclosure in any way and is merely one example.

Figure 11:
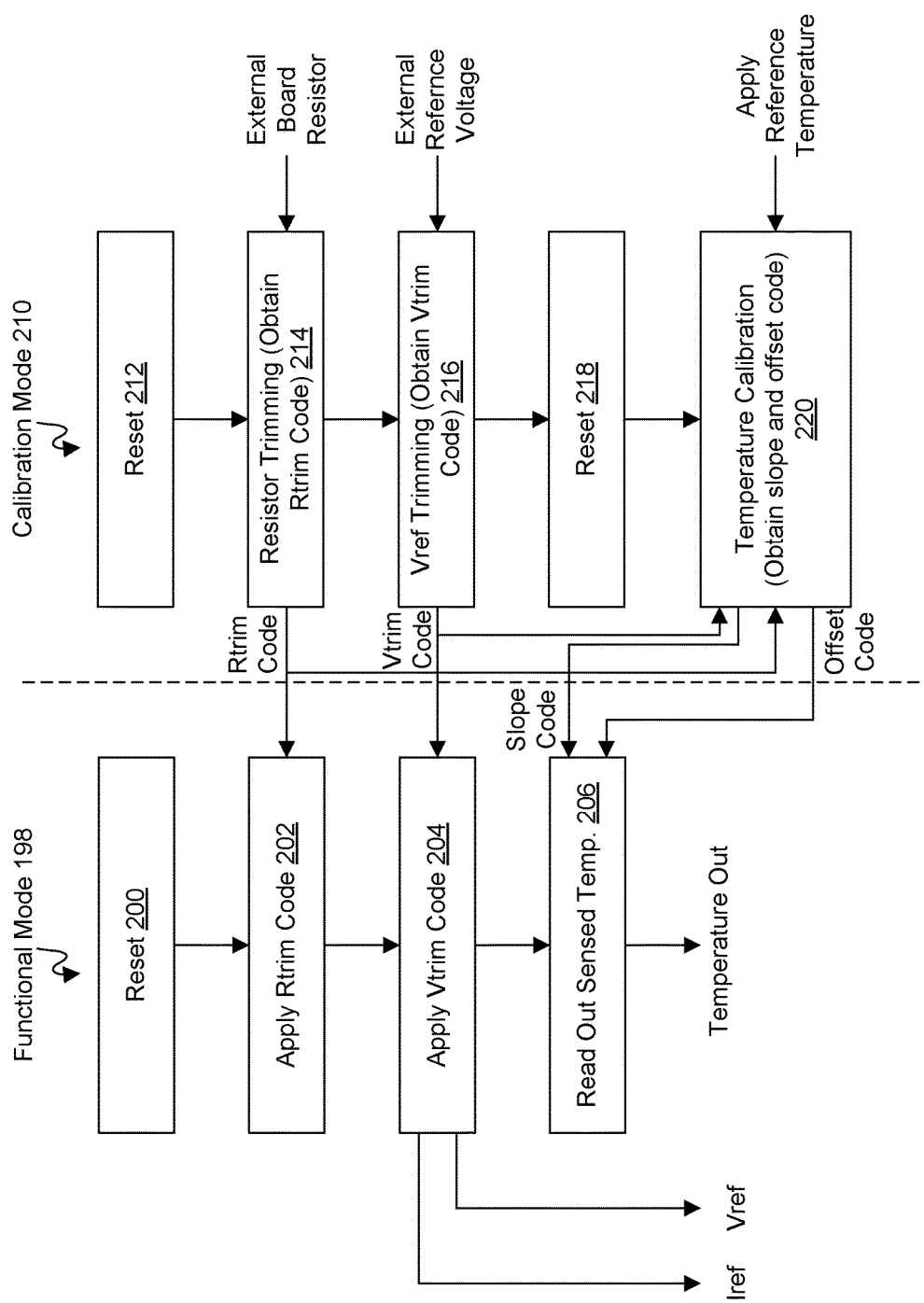
FIG. 11 is a flow chart for a functional mode and a calibration mode of some embodiments directed to a temperature sensor.

FIG. 11 is a flow chart for a functional mode and a calibration mode of some embodiments directed to a temperature sensor of the present disclosure. In such embodiments directed to a temperature sensor, a calibration mode 210 can be performed by the temperature sensor. The temperature sensor can be reset 212 to initialize all its various parameters to a default state. Once initialized, resistor trimming 214 can be performed to generate a resistor trim code R_trim_code (also referred to as "Rtrim code" or "Res_trim_code"). As discussed, an internal programmable resistor of the temperature sensor can be compared with an external board resistor to determine the resistor trim code for adjusting the resistance of the internal programmable resistor to match or come substantially close to the external board resistor.

After the resistor trim code is determined, certain programmable resistors of the temperature sensor can be calibrated according to the resistor trim code. The determined resistor trim code obtained during the resistor trimming step 214 is stored for later use in the calibration mode 210 and for a functional mode 198 for the temperature sensor.

Next, a reference voltage trimming can be performed 216 to determine a voltage trim code V_trim_code (also referred to as "Vtrim code" or "Vref_trim_code") to apply to back gates of certain transistors with back-gate bias control of the temperature sensor. An internally generated reference voltage of the temperature sensor is compared with an external reference voltage to determine the voltage trim code. The voltage trim code can then be used to adjust the back gates of the transistors, so that the internally generated reference voltage can match or substantially come close to the external reference voltage. The final voltage trim code obtained during the reference voltage trimming step 216 can be stored for use during the functional mode 198 of the temperature sensor.

Once the voltage trim code is stored, the temperature sensor can be reset 218. Using the voltage trim code and applying a reference temperature, temperature calibration can be performed 220 to obtain a slope code and an offset code to be used during the functional mode and for performing temperature sensing. For temperature calibration, known temperatures are applied on a semiconductor die having the temperature sensor and temperature readings are collected for those known temperatures. Slope and offset codes are derived from deviations between observed readings and expected readings. These codes can be fed to the readout circuit of the temperature sensor for compensation.

In the functional mode 198, a reset is performed 200 to set the various parameters to a default setting. Next, the stored resistor trim code can be applied 202 to programmable resistors of the temperature sensor. The stored voltage trim code can be applied 204 to the back-gate bias generator of the temperature sensor for recalibration of the sensor. A predefined value relative to the stored voltage trim code can be initially used by the bias generator to generate $V_{BG}$. The predefined value is ramped up after each iteration of the feedback loop, until the back-gate voltage indicative of the stored voltage trim code is applied on the certain back gates of the temperature sensor. The currents $I_{REF}$ and $I_{PTAT}$ and the voltage $V_{REF}$ are outputted, and the temperature sensing can be performed to generate a temperature out based on the slope code and offset code. The sensed temperature is read out 206.

It is appreciated that the order of the steps in FIG. 11 can be rearranged and that some steps may be omitted altogether. It is within the scope of the present disclosure that such reordering of steps and omission of inconsequential steps are within the scope of the present disclosure, and that the present flow chart is not meant to limit the subject matter directed to a temperature sensor to the specific order and steps disclosed. For instance, a method for calibrating a temperature sensor for integrated circuits can comprise the steps of: generating a resistor trim code; applying the generated resistor trim code to programmable resistors of the temperature sensor; generating a voltage trim code; applying the voltage trim code to a back-gate bias generator of the temperature sensor.

Furthermore in the generating the resistor trim code step, this step can further comprise the sub-steps of: generating an internal reference voltage by applying a current on an internal programmable resistor; generating an external reference voltage by applying the current on an external resistor; generating a reference voltage comparison signal by comparing the internal reference voltage and the external reference voltage; tracking the reference voltage comparison signal; adjusting a resistance of the internal programmable resistor as a function of the tracked voltage comparison signal, where the resistance is adjusted via the resistor trim code; and repeating the previous steps starting at the generating the internal reference voltage step.

Even more so, the repeating step can be performed until a resistor trimming done signal is initiated, where the resistor trimming done signal has an edge transition when an edge detection has been detected and the resistor trimming is enabled. Also, the generating a voltage trim code step can further comprise the sub-steps of: comparing an internal reference voltage and an external reference voltage; updating a counter based on the compared reference voltages; and generating a back-gate voltage as a function of the updated counter, wherein the updated counter is the voltage trim code. The internal reference voltage is adjusted based on the generated back-gate voltage, where the previous steps can be repeated using the adjusted internal reference voltage. When the adjusted internal reference voltage is within a predefined threshold voltage of the external reference voltage (or there is an edge transition), the generating the voltage trim code step can be stopped In other embodiments, the applying the voltage trim code step further comprises the sub-steps of: comparing a calibrated voltage trim code and an applied voltage trim code; updating the applied voltage trim code as a function of the compared trim codes; generating a corresponding back-gate voltage based on the updated voltage trim code; and repeating the sub-steps starting at the comparing step using the updated voltage trim code as the applied voltage trim code. The repeating step can be disabled once an edge transition has settled for the compared trim codes.

Figure 12:
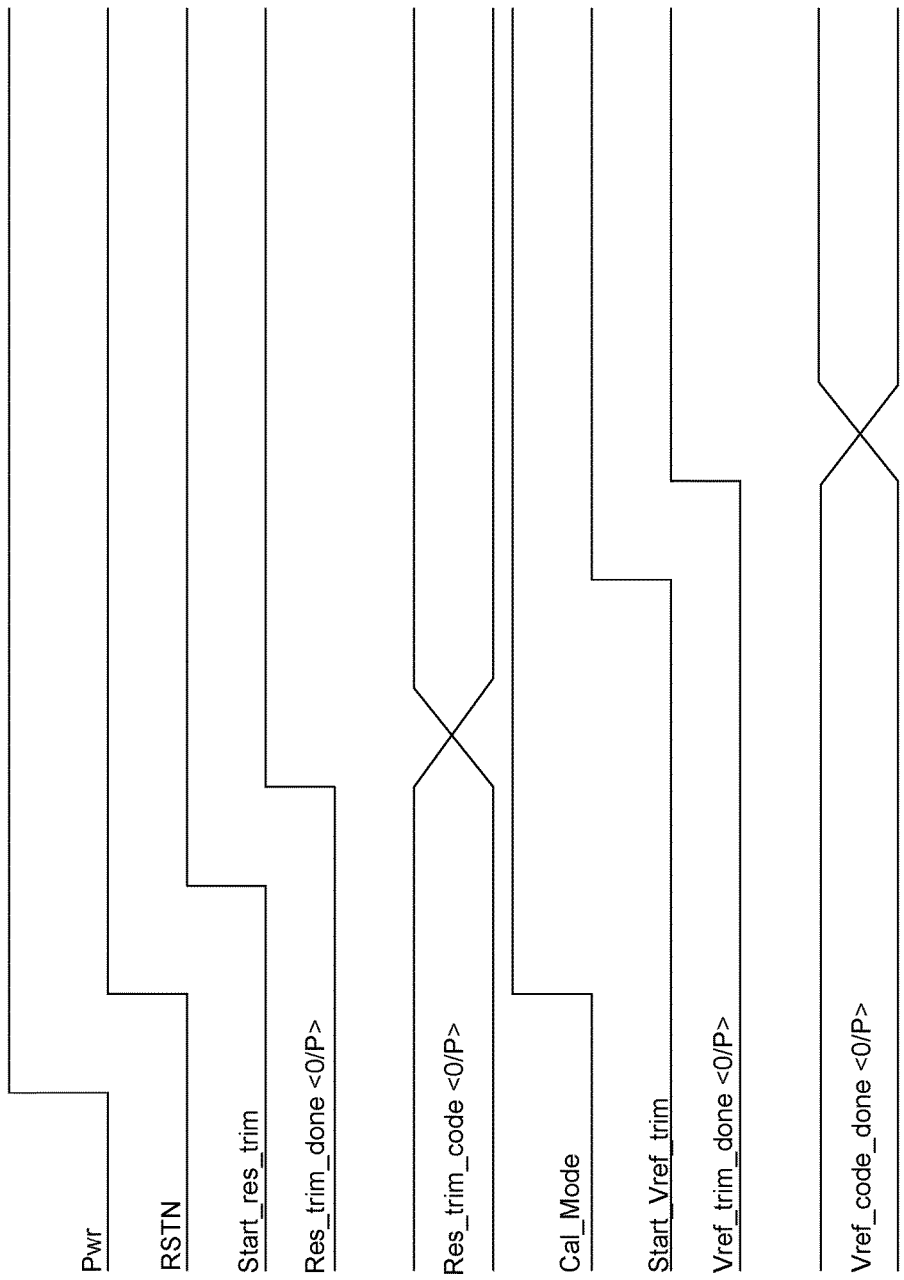
FIG. 12 is a graphical representation of a timing for signals of some embodiments directed to a temperature sensor in a calibration mode.

FIG. 12 is a graphical representation of a timing for signals of a temperature sensor of the present disclosure in a calibration mode. The various signals during calibration can include a power signal PWR, a reset signal RSTN, a resistor trimming start signal Start_res_trim, a resistor trimming done signal Res_trim_done, a resistor trim code Res_trim_code, a calibration mode signal Cal_mode, a voltage trimming start signal Start_Vref_trim, a voltage trimming done signal Vref_trim_done, and a voltage trim code Vref_trim_code. It is important to note that various bits for some of the signals may be omitted or are not shown in the instant figure. The instant graphical representation is merely a sample timing diagram to aid in the understanding of the present disclosure, but is not meant to be limiting in any way.

Figure 13:
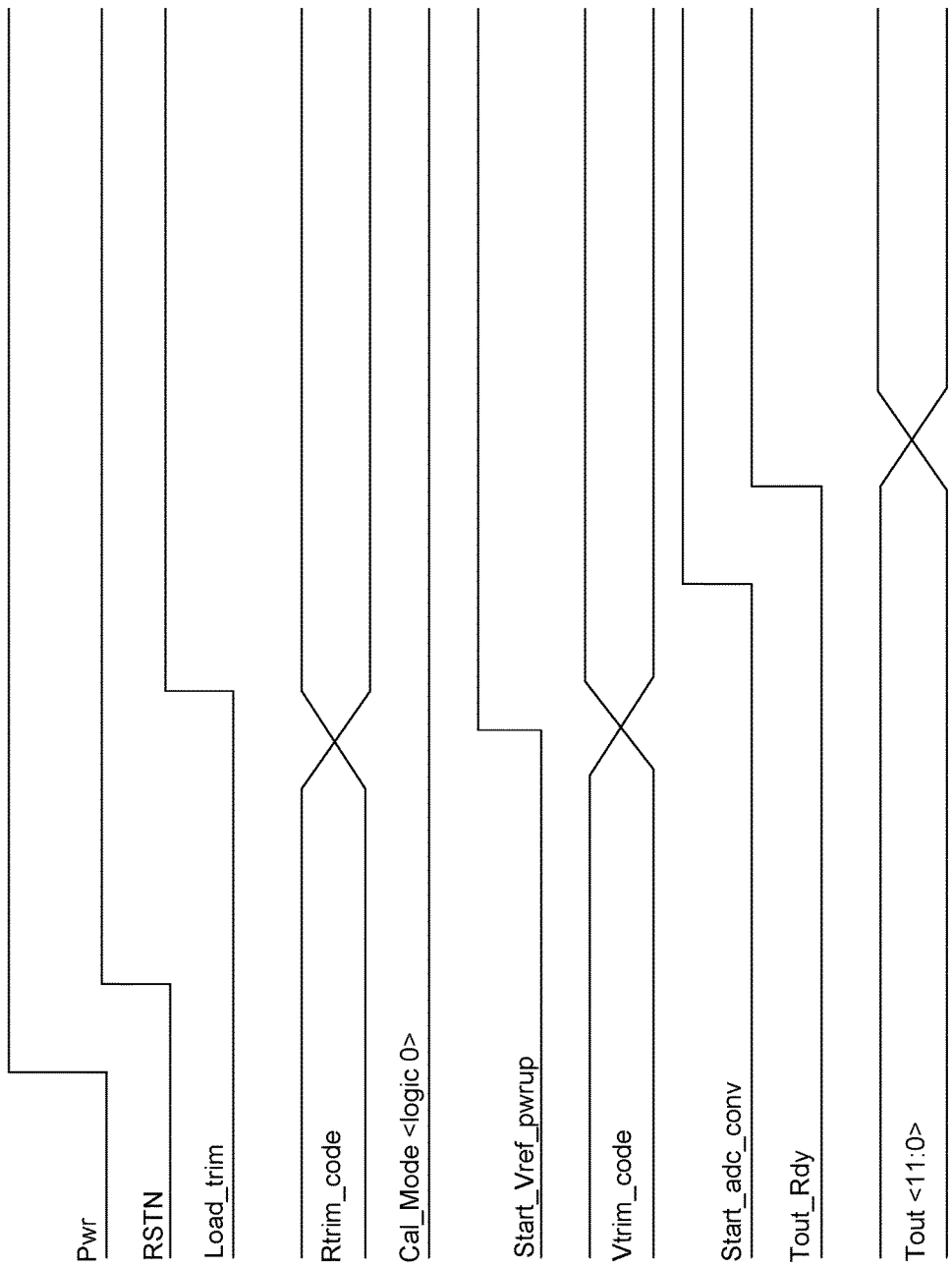
FIG. 13 is a graphical representation of a timing for signals of some embodiments directed to a temperature sensor in a functional mode.

FIG. 13 is a graphical representation of a timing for signals of a temperature sensor of the present disclosure in a functional mode. The various signals during the functional mode can include a power signal PWR, a reset signal RSTN, a load trim signal Load_trim, a resistor trim code R_trim_code, a calibration mode signal Cal_mode, a start voltage power up signal Start_Vref_pwrup, a voltage trim code V_trim_code, a start ADC conversion signal Start_ADC_Conv, a temperature reading ready signal Tout_Rdy, and a temperature out signal Tout. It is important to note that various bits for some of the signals may be omitted or are not shown in the instant figure. The instant graphical representation is merely a sample timing diagram to aid in the understanding of the present disclosure, but is not meant to be limiting in any way.

While the disclosure has been described with reference to certain embodiments, it is to be understood that the disclosure is not limited to such embodiments. Rather, the disclosure should be understood and construed in its broadest meaning, as reflected by the following claims. Thus, these claims are to be understood as incorporating not only the apparatuses, methods, and systems described herein, but all those other and further alterations and modifications as would be apparent to those of ordinary skilled in the art. Furthermore, it will be understood by those skilled in the art that various changes in form and details may be made therein without departing from the spirit and scope of the present disclosure as defined by the appended claims and their equivalents.

We claim:

1. A temperature sensor for integrated circuits, comprising:
    a voltage-gate-source generator having sensing transistors;
    an Ibias generator, wherein the Ibias generator is coupled to the voltage-gate-source generator, wherein the Ibias generator comprises programmable resistors, back-gate biased transistors, PMOS transistors, an operational amplifier, and a capacitor, and wherein the programmable resistors have inputs for a resistor trimming code;
    a back-gate bias generator, wherein the back-gate bias generator is coupled to back gates of the sensing transistors of the voltage-gate-source generator and to back gates of the back-gate biased transistors of the Ibias generator; and
    a temperature read-out circuit, wherein the temperature read-out circuit is coupled to gates of the sensing transistors of the voltage-gate-source generator and wherein the temperature read-out circuit has at least one temperature output.

2. The temperature sensor of claim 1 further comprising a reference generator, wherein the temperature read-out circuit and the voltage-gate-source generator are coupled via the reference generator.

3. The temperature sensor of claim 1 wherein the temperature sensor is in a functional mode and the back-gate bias generator includes a $V_{REF\_INT}$ and a voltage trim code and wherein the back-gate bias generator sets a back bias voltage based on the $V_{REF\_INT}$ and the voltage trim code to resolve inter-dependence between $V_{BG}$ and $V_{REF\_INT}$.

4. The temperature sensor of claim 1 further comprising a resistor trimmer, wherein the resistor trimmer has an output for a resistor trimming code and wherein the resistor trimmer calibrates an internal resistance to an external resistance.

5. The temperature sensor of claim 4 wherein the resistor trimmer comprises:
    a comparator;
    an internal programmable resistor;
    an edge detector;
    an AND gate;
    a counter; and
    PMOS transistors,
    wherein the PMOS transistors are coupled to the internal programmable resistor and an external resistor via a pad,
    wherein the comparator is coupled to the internal programmable resistor and the pad,
    wherein an output of the comparator is coupled to the edge detector and a first input of the counter,
    wherein the edge detector has an output,
    wherein the AND gate has inputs for a negative of the output of the edge detector, a start signal, and a clock signal,
    wherein an output of the of the AND gate is coupled to a second input of the counter, and
    wherein the counter has an output coupled to the internal programmable resistor.

6. The temperature sensor of claim 1 wherein the back-gate bias generator comprises:
    a first comparator;
    a second comparator;
    a multiplexer, wherein an output of the first comparator is coupled to a first input of the multiplexer and wherein an output of the second comparator is coupled to a second input of the multiplexer;

a counter, wherein an output of the multiplexer is coupled to a first input of the counter; and
a digital-to-analog converter ("DAC"),
wherein an output of the counter is coupled to an input of the DAC and a first input of the first comparator,
wherein a voltage trimming code is coupled to a second input of the first comparator,
wherein an internal reference voltage is coupled to a first input of the second comparator and the DAC,
wherein an external reference voltage is coupled to a second input of the second comparator, and
wherein a control input of the multiplexer is coupled to a calibration mode signal.

7. The temperature sensor of claim 6 wherein the back-gate bias generator further comprises:
a second multiplexer, wherein a control input of the second multiplexer is coupled to the calibration mode;
a first AND gate;
a second AND gate;
a first edge detector; and
a second edge detector,
wherein an input of the first edge detector is coupled to the output of the first comparator,
wherein a negated output of the first edge detector, a power startup signal, and a clock signal are coupled to inputs of the first AND gate,
wherein an output of the first AND gate is coupled to a first input of the second multiplexer,
wherein an input of the second edge detector is coupled to the output of the second comparator,
wherein a negated output of the second edge detector, a calibration startup signal, and the clock signal are coupled to inputs of the second AND gate,
wherein an output of the second AND gate is coupled to a second input of the second multiplexer, and
wherein an output of the second multiplexer is coupled to a second input of the counter.

8. A method for operating a temperature sensor for integrated circuits having a back-gate bias generator, comprising the steps of:
generating a resistor trim code;
applying the generated resistor trim code to programmable resistors of the temperature sensor;
generating a voltage trim code, wherein the generating the voltage trim code comprises the steps of:
comparing an internal reference voltage and an external reference voltage;
updating a counter based on the compared reference voltages; and
generating a back-gate voltage as a function of the updated counter, wherein the updated counter is the voltage trim code and wherein the back-gate voltage is generated to adjust the internal reference voltage closer to the external reference voltage; and
applying the voltage trim code to the back-gate bias generator of the temperature sensor.

9. The method of claim 8 in the generating the resistor trim code step comprising the sub-steps of:
generating an internal reference voltage by applying a current on an internal programmable resistor;
generating an external reference voltage by applying the current on an external resistor;

generating a reference voltage comparison signal by comparing the internal reference voltage and the external reference voltage;
tracking the reference voltage comparison signal;
adjusting a resistance of the internal programmable resistor as a function of the tracked voltage comparison signal, wherein the resistance is adjusted via the resistor trim code; and
repeating the previous steps starting at the generating the internal reference voltage step.

10. The method of claim 9 wherein the repeating step is performed until a resistor trimming done signal is initiated, wherein the resistor trimming done signal has an edge transition when an edge detection has been detected and the resistor trimming is enabled.

11. The method of claim 8 wherein the temperature sensor operates in a functional mode and comprises the steps of:
retrieving the voltage trim code;
retrieving the internal reference voltage; and
adjusting the internal reference voltage to set the back-gate voltage in response to the voltage trim code to resolve inter-dependence between the internal reference voltage and the back-gate voltage.

12. The method of claim 8 wherein the internal reference voltage is adjusted based on the generated back-gate voltage, wherein the generating the voltage trim code step is repeated using the adjusted internal reference voltage, and wherein, when the adjusted internal reference voltage is within a predefined threshold voltage of the external reference voltage, the generating the voltage trim code step is stopped.

13. The method of claim 8 wherein the applying the voltage trim code step comprises the sub-steps of:
comparing a calibrated voltage trim code and an applied voltage trim code;
updating the applied voltage trim code as a function of the compared trim codes;
generating a corresponding back-gate voltage based on the updated voltage trim code;
repeating the sub-steps starting at the comparing step using the updated voltage trim code as the applied voltage trim code.

14. The method of claim 13 wherein the repeating step is disabled once an edge transition has settled for the compared trim codes.

15. A temperature sensor for integrated circuits, comprising:
a voltage-gate-source generator having sensing transistors;
an Ibias generator, wherein the Ibias generator is coupled to the voltage-gate-source generator, wherein the Ibias generator comprises programmable resistors, biasing transistors, PMOS transistors, an operational amplifier, and a capacitor, and wherein the programmable resistors have inputs for a resistor trimming code;
a back-gate bias generator, wherein the back-gate bias generator is coupled to back gates of the sensing transistors of the voltage-gate-source generator and coupled to back gates of the biasing transistors of the Ibias generator;
a reference generator; and
a temperature read-out circuit, wherein the temperature read-out circuit is coupled to gates of the sensing transistors of the voltage-gate-source generator via the reference generator, and wherein the temperature read-out circuit has at least one temperature output.

16. The temperature sensor of claim 15 further comprising a resistor trimmer,
  wherein the resistor trimmer has an output for the resistor trimming code,
wherein the resistor trimmer comprises:
  a comparator;
  an internal programmable resistor;
  an edge detector;
  an AND gate;
  a counter; and
  PMOS transistors,
  wherein the PMOS transistors are coupled to the internal programmable resistor and an external resistor via a pad,
  wherein the comparator is coupled to the internal programmable resistor and the pad,
  wherein an output of the comparator is coupled to the edge detector and the counter,
  wherein the edge detector has an output,
  wherein the AND gate has inputs for the negative of the output of the edge detector, a start signal, and a clock signal,
  wherein an output of the of the AND gate is coupled to a clock input for the counter, and
  wherein the counter has an output coupled to the internal programmable resistor.

17. The temperature sensor of claim 15 wherein the back-gate bias generator comprises:
  a first comparator;
  a second comparator;
  a multiplexer, wherein an output of the first comparator is coupled to a first input of the multiplexer and wherein an output of the second comparator is coupled to a second input of the multiplexer;
  a counter, wherein an output of the multiplexer is coupled to an input of the counter; and
  a digital-to-analog converter ("DAC"),
  wherein an output of the counter is coupled to an input of the DAC and a first input of the first comparator,
  wherein a voltage trimming code is coupled to a second input of the first comparator,
  wherein an internal reference voltage is coupled to a first input of the second comparator and the DAC,
  wherein an external reference voltage is coupled to a second input of the second comparator, and
  wherein a control input of the multiplexer is coupled to a calibration mode signal.

18. The temperature sensor of claim 17 wherein the back-gate bias generator further comprises:
  a second multiplexer, wherein a control input of the second multiplexer is coupled to the calibration mode;
  a first AND gate;
  a second AND gate;
  a first edge detector; and
  a second edge detector,
  wherein an input of the first edge detector is coupled to the output of the first comparator,
  wherein a negated output of the first edge detector, a power startup signal, and a clock signal are coupled to inputs of the first AND gate,
  wherein an output of the first AND gate is coupled to a first input of the second multiplexer,
  wherein an input of the second edge detector is coupled to the output of the second comparator,
  wherein a negated output of the second edge detector, a calibration startup signal, and the clock signal are coupled to inputs of the second AND gate,
  wherein an output of the second AND gate is coupled to a second input of the second multiplexer, and
  wherein an output of the second multiplexer is coupled to a clock input of the counter.

* * * * *